July 15, 1952  T. A. ARROWOOD  2,603,505
DETACHABLE WHEEL MOUNTING UNIT FOR BOATS
Filed July 22, 1948
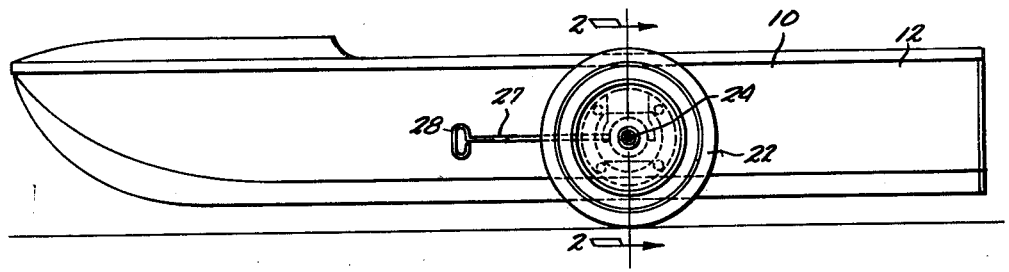
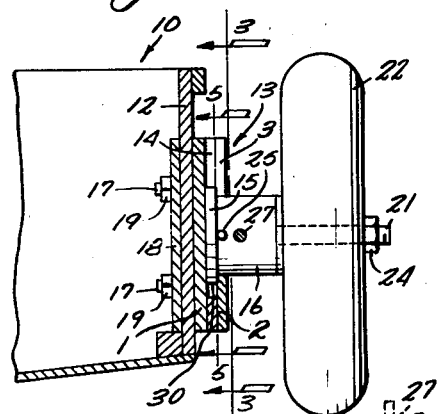
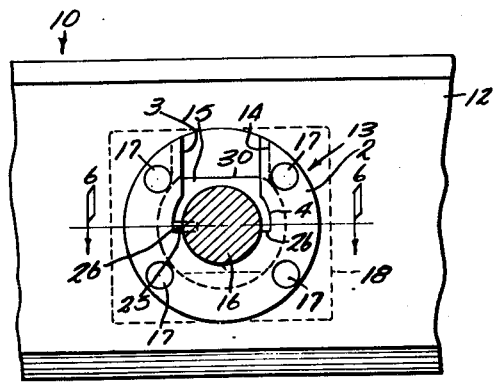
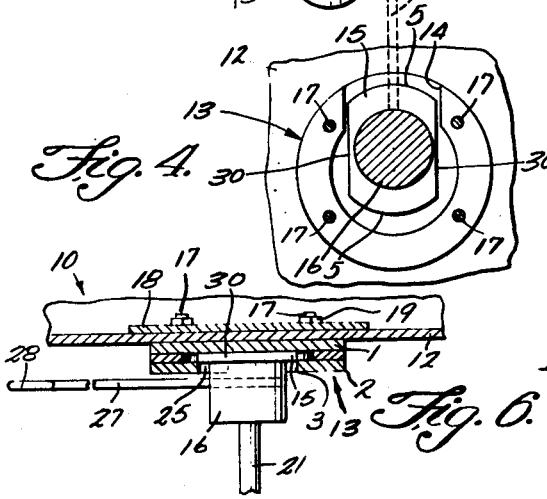
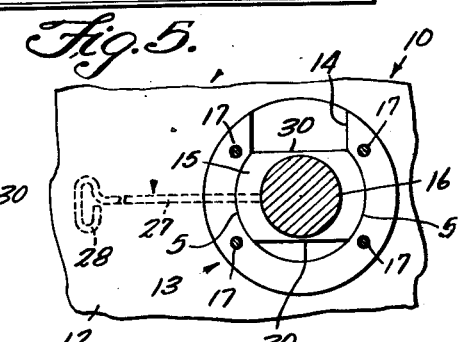
INVENTOR.
Thomas A. Arrowood,
BY Victor J. Evans & Co.
ATTORNEYS Patented July 15, 1952

2,603,505

UNITED STATES PATENT OFFICE 2,603,505

DETACHABLE WHEEL MOUNTING UNIT FOR BOATS

Thomas A. Arrowood, Corpus Christi, Tex.

Application July 22, 1948, Serial No. 40,120

2 Claims. (Cl. 280—61)

This invention relates to a quick detachable wheel mounting unit for boats.

It is an object of the present invention to provide a detachable wheel for a boat which can be easily and quickly detached from the boat after the boat has been put afloat or can be attached while the boat is still afloat and before the same is dragged onto the beach and whereby to lighten the load of persons using a boat.

Other objects of the present invention are to provide a wheel mounting unit for a boat which is quickly detachable, simple in construction, inexpensive to manufacture, convenient to use and efficient in operation.

For other objects and for a better understanding of the invention, reference may be had to the following detailed description taken in connection with the accompanying drawing, in which Fig. 1 is a side elevational view of a boat and of a quick detachable wheel mounting unit connected thereto.

Fig. 2 is a sectional view taken on line 2—2 of Fig. 1.

Fig. 3 is a transverse sectional view taken on line 3—3 of Fig. 2.

Fig. 4 and Fig. 5 are sectional views taken generally on line 5—5 of Fig. 2 and showing respectively the positions of the wheel mounting upon being extended into the receiving member on the boat and after the mounting has been turned to retain the same against vertical displacement.

Fig. 6 is a longitudinal sectional view taken on line 6—6 of Fig. 3.

Referring now to the figures, 10 represents a boat having a side 12 upon which a mounting bracket 13 is secured. This mounting bracket has a slot 14 accessible from the top of the same and through which a flange 15 of a wheel axle 16 may be extended. The mounting bracket 13 is secured to the side of the boat 12 by bolts 17 extending through the side of the boat and by a clamping plate 18 on the inner face of the boat. Nuts extend over the bolts as indicated at 19. An axle extension 21 has a wheel 22 journalled on the same. A nut 24 holds the wheel in place on the extension 21. The axle has a pin 25 adapted to engage with horizontal seat or cut out 26 within the recess 14 whereby the axle will be stopped from rotation by arm 27 with handle 28 thereon. The flange 15 has straight sides 30 so that it can enter the slot 14. Thereafter the axle is turned so that the flange extends horizontally as shown in Fig. 5 so as to be held against vertical displacement through the upper end of the slot 14.

The bracket 13 includes laterally spaced apart walls 1 and 2 which enclose the recess 14. It will be seen from the drawings that the recess 14 is open at the top and circular in configuration therebelow. The wall 2 includes a vertical slot 3 that terminates in a cutout 4 and the width of the slot is less than the width of the corresponding portion of the recess 14, while the size of the cutout 4 is also less than the size of the corresponding portion of the recess 14. The flange 15 includes opposed arcuate portions 5, and the width of the flange 15 between the sides thereof is less than the width of the recess 14, but greater than the width of the slot 3. Also, the maximum extent between the arcuate portions 5 is less than the maximum extent of the circular portion of the recess, but is greater than the extent of the cutout 4, so that the flange 15 will be held in the recess. The stop pin 25 is adapted to seat in the cutout 4 when the axle 16 has been rotated to the proper location within the slot 3 to retain the axle therewithin.

While various changes may be made in the detail construction, it shall be understood that such changes shall be within the spirit and scope of the present invention as defined by the appended claims.

I claim:

1. In a detachable wheel mounting for a boat, a bracket adapted to be connected to the side of the boat, said bracket having laterally spaced apart walls secured to each other along the greater extent of their peripheries and enclosing a vertical recess having one end which opens at the top of said bracket and terminating at its other end in a recess of circular configuration; the outer of said walls having a vertical slot therein which terminates in a cut-out having a horizontally disposed portion; the slot and cutout bearing a superimposed relationship to the vertical and circular recess with the width of the vertical recess being greater than the width of the slot and the maximum extent of the circular recess being greater than the maximum extent of the cut-out, an axle provided with a flange detachably seated in said slot, said flange having a pair of opposed parallel sides interconnected at each end by arcuate portions with the width of the flange between the sides being less than the width of the recess but greater than the width of the slot and with the maximum extent between the arcuate end portions of the flange being less than the maximum extent of the circular recess but greater than the maximum extent of the cut-out so that when the flange with its laterally outwardly extending axle is inserted in the vertical recess, the axle will extend out of the slot and the relative widths of the slot and flange will prevent the flange from falling out, and a stop pin mounted on said axle and adapted to seat in said cut-out when the axle has been rotated to the proper location within the slot to retain the axle therewithin.

2. In a detachable wheel mounting for a boat, a bracket adapted to be connected to the side of the boat, said bracket having laterally spaced apart walls secured to each other along the greater extent of their peripheries and enclosing a vertical recess having one end which opens at the top of said bracket and terminating at its other end in a recess of circular configuration; the outer of said walls having a vertical slot therein which terminates in a cut-out having a horizontally disposed portion; the slot and cut-out bearing a superimposed relationship to the vertical and circular recess with the width of the vertical recess being greater than the width of the slot and the maximum extent of the circular recess being greater than the maximum extent of the cut-out, an axle provided with a flange detachably seated in said slot, said flange having a pair of opposed parallel sides interconnected at each end by arcuate portions with the width of the flange between the sides being less than the width of the recess but greater than the width of the slot and with the maximum extent between the arcuate end portions of the flange being less than the maximum extent of the circular recess but greater than the maximum extent of the cut-out so that when the flange with its laterally outwardly extending axle is inserted in the vertical recess, the axle will extend out of the slot and the relative widths of the slot and flange will prevent the flange from falling out, a stop pin mounted on said axle and adapted to seat in said cut-out when the axle has been rotated to the proper location within the slot to retain the axle therewithin, an arm having one end secured to said axle for rotating the axle in said slot and a handle secured to the other end of said arm.

THOMAS A. ARROWOOD.

REFERENCES CITED

The following references are of record in the file of this patent:

UNITED STATES PATENTS

| Number | Name | Date |
|---|---|---|
| 306,874 | Thatcher | Oct. 21, 1884 |
| 832,628 | Schreffler | Oct. 9, 1906 |
| 1,524,958 | Transue | Feb. 3, 1925 |
| 1,840,599 | Nibbe | Jan. 12, 1932 |
| 2,332,752 | Ratcliff | Oct. 26, 1943 |
| 2,429,190 | McArthur | Oct. 14, 1947 |